United States Patent Office 2,713,583
Patented July 19, 1955

2,713,583

DERIVATIVES OF IMIDAZOLINES AND PYRIMIDINES

Alvin Howard Smith, Kirkwood, Mo., assignor to Petrolite Corporation, a corporation of Delaware No Drawing. Application April 10, 1952,
Serial No. 281,650

6 Claims. (Cl. 260—309.6)

The present invention is concerned with certain new chemical products, compounds, or compositions which have useful application in various arts. It includes methods or procedures for manufacturing said new chemical products, compounds, or compositions, as well as the products, compounds or compositions themselves.

The present invention is concerned with compounds derived from either polyamines in which the nitrogen atoms are separated by an ethylene radical or by a propylene radical or by a trimethylene radical. Reference to a propylene radical means a methyl substituted ethylene radical, i. e., having only 2 carbon atoms between nitrogen atoms. From a practical standpoint as will be explained hereinafter, the polyethylene imidazolines are most readily available and most economical for use. Thus, broadly speaking, the present invention is concerned with synthetic hydrophile products; said synthetic hydrophile products being obtained by reaction between (A) a polycarboxy acid, and (B) a highly oxypropylated substituted ring compound consisting of the substituted imidazolines and pyrimidines of the formulae

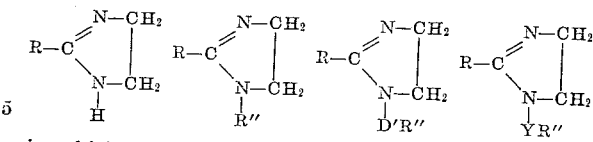

in which R' is a divalent alkylene radical selected from the class consisting of $$-CH_2CH_2-$$
$$-CH_2CH_2CH_2-$$
$$-\underset{CH_3}{\overset{H}{\underset{|}{C}}}-CH_2-$$
$$-CH_2-\underset{|}{\overset{CH_3}{C}H}-CH_2-$$

and in which D' represents a divalent, non-amino, organic radical containing less than 25 carbon atoms, composed of elements from the group consisting of C, H, O, and N, and with the proviso that D' be free from any group having more than 7 uninterrupted carbon atoms in a single radical; Y represents a divalent, organic radical containing less than 25 carbon atoms, composed of elements from the group consisting of C, H, O, and N, and containing at least one amino group, and with the proviso that Y be free from any group having more than 7 uninterrupted carbon atoms in a single radical; and R is a member of the class consisting of hydrogen, aliphatic hydrocarbon radicals, hydroxylated aliphatic hydrocarbon radicals; cycloaliphatic hydrocarbon radicals, hydroxylated cycloaliphatic hydrocarbon radicals, and aromatic, and hydroxylated aromatic hydrocarbon radicals; R" is a member of the class consisting of hydrogen, aliphatic radicals and cycloaliphatic radicals, with the proviso that in the occurrence of the radicals R and R" there be present no more than 7 uninterrupted carbon atoms; and with the further proviso that (1) there be introduced at least 12 moles of propylene oxide per substituted nitrogen-containing ring compound, and that (2) there be employed at least one mole of the polycarboxy reactant for each reactive hydroxyl radical.

More specifically, and in a more limited scope, the present invention is concerned with hydrophile synthetic products; said hydrophile synthetic products being obtained by reaction between (A) a polycarboxy acid, and (B) a highly oxypropylated substituted imidazoline consisting of

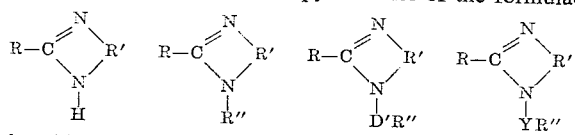

in which D' represents a divalent, non-amino, organic radical containing less than 25 carbon atoms, composed of elements from the group consisting of C, H, O, and N; and with the proviso that D' be free from any group having more than 7 uninterrupted carbon atoms in a single radical; Y represents a divalent, organic radical containing less than 25 carbon atoms, composed of elements from the group consisting of C, H, O, and N, and containing at least one amino group, and with the proviso that Y be free from any group having more than 7 uninterrupted carbon atoms in a single radical; and R is a member of the class consisting of hydrogen, aliphatic hydrocarbon radicals, hydroxylated aliphatic hydrocarbon radicals, cycloaliphatic hydrocarbon radicals, and hydroxylated cycloaliphatic hydrocarbon radicals, R" is a member of the class consisting of hydrogen, aliphatic radicals and cycloaliphatic radicals, wtih the proviso that in the occurrence of the radicals R and R" there be present not more than 7 uninterrupted carbon atoms; and with the further proviso that (1) there be introduced at least 12 moles of propylene oxide per substituted nitrogen-containing ring compound, and that (2) there be employed at least one mole of the polycarboxy reactant for each reactive hydroxyl radical.

Generally speaking, as explained hereinafter, almost invariably there will be employed one mole of polycarboxy reactant for each hydroxyl radical. More can be used by virtue of an amidification reaction. In some instances, however, one can use modestly less than one mole of the polycarboxy reactant for each reactive hydroxyl radical without in any way changing the nature of the instant invention, provided only there is no difficulty from cross-linking, gelation, formation of rubber-like compounds, etc. In other words, if gels are formed the amount of polycarboxy reactant should be increased. If no gel is formed a somewhat reduced amount can be employed, provided that rubberlike character does not enter.

These materials can be obtained in any suitable manner. They can either be purchased in the open market or the substituted imidazolines can be prepared as described in U. S. Patent Re. 23,227, dated May 9, 1950, to Blair and Gross. The most readily available sources of polyamines are polyethylene polyamines having from 2 to 7 or 8 nitrogen atoms. The most readily available source of the hydrocarbon radical which becomes substituted in the imidazoline or pyrimidine ring in the 2-position is a monocarboxy acid having approximately 1 to 3 carbon atoms as exemplified by formic acid, acetic acid, glycolic acid, propionic acid, or the like. Other acids may be used also ranging from 1 to 8 carbon atoms. A partial enumeration of these might include acetoacetic acid, butyric acid, valeric acid, caproic acid, caprylic acid, benzoic acid, toluic acid, cyclopropanemonocarboxylic acid, cyclobutanemonocarboxylic acid, cyclopentane monocarboxylic acid, cyclohexanemonocarboxylic acid, acrylic acid, crotonic acid, salicylic acid, anisic acid, and pyromucic acid.

The most suitable alkylene oxide to use is propylene oxide. Indeed, for all practical purposes, the derivatives obtained from propylene oxide are so markedly superior to other alkylene oxides, for instance, even nearby oxides such as ethylene oxide and the various butylene oxides, that such other oxides can be ignored in this invention and it be considered as limited specifically to propylene oxide. As pointed out elsewhere, without detracting from the spirit of the invention one could employ a small percentage of ethylene oxide or butylene oxide along with the propylene oxide provided it did not affect the inherent character of the compound. The preparation of substituted imidazoline is well known and requires no discussion. The oxyalkylation of substituted imidazolines is well known. See, for example, U. S. Patent No. 2,211,011, dated August 13, 1940, to Chwala, and U. S. Patent No. 2,468,180, dated April 26, 1949, to De Groote and Keiser. It is to be noted that the above patents are concerned with oxyalkylation broadly and are not limited to oxyalkylation, and to the extent that oxypropylation is employed the degree is modest and not within the description or characterization of excessive oxypropylation as herein included as part of the invention.

What has been said in the preceding paragraph may be explained further in the following manner. If a water-soluble substance, such as water itself, is treated with ethylene oxide the resultant or mixture of compounds so obtained continues to be water-soluble to a high molecular weight range, for instance, 2,000. If, on the other hand, propylene oxide is used instead of ethylene oxide, then and in that event when approximately 12 moles or more by propylene oxide are introduced per hydrophile unit water-insolubility results. For example, compare the water-insolubility of polypropylene glycol having twice this molecular weight. As far as I am aware there is no previous reference to highly oxypropylated substituted imidazolines and pyrimidines, i. e., the introduction of at least 12 and preferably more than 12 moles of propylene oxide per substituted imidazoline or pyrimidine molecule.

The amount of propylene oxide used need not be limited to being just moderately in excess of 12 moles of propylene oxide per imidazoline or pyrimidine molecule. In a general way, I prefer to use approximately 6 to 10 moles of propylene oxide per nitrogen atom in the original polyalkylene amine and, more specifically, the polyethylene amine employed as a reactant. In such instances where the substituted imidazoline or pyrimidine is derived from a hydroxylated acid derivative as described elsewhere, even larger amounts of propylene oxide are not only acceptable but may even be desirable.

Having obtained the oxypropylated substituted imidazoline or pyrimidine hereinafter described in detail, the next step is esterification involving a polycarboxy acid, and preferably a dicarboxy acid or reactant, in such molal ratio as to insure the presence of esterified carboxyl radicals. As a matter of fact, I have found it preferable to use at least one mole of the polycarboxy reactant for each hydroxyl radical present, but not necessarily limited as stated elsewhere.

Attention is directed to my co-pending application, Serial No. 281,646, filed April 10, 1952. In said co-pending application the products described are substantially comparable to the herin described derivatives or processes except that the oxypropylated imidazoline or pyrimidine, or equivalent compound, contains at least one group in which there is present at least one radical having present an uninterrupted group of 8 to 32 carbon atoms. Such group or radical introduces a definite hydrophobe effect. Compare such hydrophobe effect with the analogous characteristics of fatty acids which have been subjected to saponification. Generally speaking, such acids having 8 or more carbon atoms present in the single radical are recognized as being detergent-forming. This property carries through to derivatives such a imidazolines or pyrimidines and oxypropylated imidazolines and pyrimidines derived from such acids.

The derivatives herein described and particularly useful as demulsifying agents do not have this specific hydrophobe group. As a rule, imidazolines and pyrimidines free from such hydrophobe group do not find utility in the various arts and processes where imidazolines and pyrimidines are frequently employed. I am unable to explain why this class of imidazolines and pyrimidines free from a group having 8 or more carbon atoms in a single radical serves as an effective initial material for the preparation of the herein described oxypropylated imidazolines and pyrimidines and which, in turn, after being converted into acidic esters are excellent demulsifiers. This difference is not purely one of nomenclature or a fictional boundary but is a factual one as is readily determined by the mere solubility differences. For instance, the acidic esters of highly oxypropylated imidazolines and pyrimidines containing a hydrophobe group of 8 to 32 carbon atoms are almost always oil-soluble, even though some of those containing less amounts of propylene oxide border on the water-dispersible side.

Attention is directed again to Table 3 appearing in my copending application, Serial No. 281,646. In the present instance where the acidic ester of the oxypropylated imidazoline or pyrimidine contains a hydrocarbon radical of 7 or less carbon atoms the product is very water-soluble and, as shown in Table 3 of this application, the use of alcohol is required to blend the material with any oil solvent. In this case the acidic esters are on the water-soluble side throughout the entire range of oxypropylation, i. e., from 12 to 60 moles of propylene oxide per mole of imidazoline or pyrimidine. As mentioned above in my co-pending application, Serial No. 281,646, only those in a lower range of oxypropylation tend to be water-dispersible.

Another factor is the viscosity of the final product which is very prominent in distinguishing between acidic esters from oxypropylated imidazolines and pyrimidines containing 8 to 32 carbon atoms per hydrocarbon radical on the one hand, and 7 or less carbon atoms per hydrocarbon radical on the other hand.

The products of the present invention in general are much thinner than the products mentioned in my co-pending application, Serial No. 281,646. This difference in viscosity not only shows up in the final finished product but also, and to a still greater degree, in the intermediate imidazoline or pyrimidine product. The imidazolines and pyrimidines of the present invention are thin compared to the viscous imidazolines and pyrimidines of my co-pending application, Serial No. 281,646. Their manufacture becomes less expensive as is exemplified by the fact that less power is required to agitate them and transport them from place-to-place because of their relative low viscosity.

These physical differences which so clearly divide off those compounds of the present invention from those of my co-pending application, Serial No. 281,646, make it difficult to understand why the products of the present invention are also such excellent demulsifiers. Nevertheless, the fact remains that they are excellent demulsifiers. In light of this unexplained showing, I have drawn a clear line of demarcation between the instant invention and the invention of my co-pending application, Serial No. 281,646.

Although the herein described products have a number of industrial applications, they are of particular value for resolving petroleum emulsions of the water-in-oil type that are commonly referred to as "cut oil," "roily oil," "emulsified oil," etc., and which comprise fine droplets of naturally-occurring waters or brines dispersed in a more or less permanent state throughout the oil which constitutes the continuous phase of the emulsion. This specific application is described and claimed in my co-pending application, Serial No. 281,649, filed April 10, 1952.

The new products are useful as wetting, detergent and leveling agents in the laundry, textile and dyeing industries; as wetting agents and detergents in the acid washing of building stone and brick; as wetting agents and spreaders in the application of asphalt in road building and the like; as a flotation reagent in the flotation separation of various aqueous suspensions containing negatively charged particles, such as sewage, coal washing waste water, and various trade wastes and the like; as germicides, insecticides, emulsifying agents, as, for example, for cosmetics, spray oils, water-repellent textile finishes; as lubricants, etc.

For convenience, what is said hereinafter will be divided into five parts:

Part 1 is concerned with the selection or preparation of the substituted imidazoline or pyrimidine;

Part 2 is concerned with the oxypropylation of the imidazoline or pyrimidine as described in Part 1, preceding;

Part 3 is concerned with the formation of the acidic ester from the oxypropylated imidazoline or pyrimidine described in Part 2, preceding, Part 4 is concerned with the nature of the oxypropylated derivative insofar that a cogeneric mixture is invariably obtained, and Part 5 is concerned with certain derivatives which can be obtained from these acidic esters and which, in turn, are valuable for a variety of purposes.

PART 1

For purpose of convenience reference is made again to Reissue Patent No. 23,227, reissued May 9, 1950, to Blair and Gross. Much of what is said herein appears in verbatim form in the text of said reissue patent. From a practical standpoint it is most satisfactory to use the cheapest commercially available reactants. In a general way this means the lower acids, such as acetic acid or glycolic acid or propionic acid which are relatively cheap and abundant. Of course, more expensive acids, such as benzoic, furoic, acetoacetic acid, and the like may be used. However, I have found no particular advantage in using the more expensive acids. The polyamines most readily available are polyethylene amines having 2 to 6, 7 or 8 nitrogen atoms. My preferred polyamines contain 3, 4 or 5 nitrogen atoms. Propylene oxide, of course, is readily available.

Oxypropylation is most readily accomplished by virtue of labile hydrogen atoms as part of the imidazoline structure. This means the presence of one or more hydrogen atoms attached to nitrogen or attached to oxygen, or both. However, it is possible to prepare an oxypropylated derivative from an imidazoline or pyrimidine in which there is no labile hydrogen atom present as part of the imidazoline or pyrimidine radical. For instance, if one prepares a compound of the following formula:

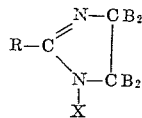

in which both R and X represent low molal groups, then obviously oxypropylation must involve the group R, assuming that X is not susceptible to oxypropylation, and B is selected from the class consisting of hydrogen atoms and methyl groups, with the proviso that the methyl group occurs not more than once. One can employ low molal acids which are oxypropylation-susceptible even after becoming part of the imidazoline ring. Such acids would be exemplified by glycolic acid (hydroxyacetic acid), hydroxypropionic acid, salicylic acid, and the like. However, with the exception of glycolic acid, these acids are more expensive and less readily available. There is no great justification for selecting expensive reactants and apparently no unusually large benefit is obtained. For this reason I prefer to use the simpler and less expensive acids as mentioned elsewhere. Also, for this reason, I prefer to use a polyamine as a reactant so that the substituted imidazoline contains a plurality of reactive amino-hydrogen atoms regardless of the acid used to form the imidazoline. In any event, the substituted imidazoline must be oxypropylation susceptible or it is not contemplated as a reactant for the instant purpose.

Compounds which I have found to be effective for the purpose described belong to the general class of cyclic amidines, and in particular are substituted imidazolines and pyrimidines, in which the imidazoline or pyrimidine molecule contains at least one aliphatic, or cycloaliphatic hydrocarbon group containing no more than 7 carbon atoms. Cyclic imidazolines and pyrimidines in which the 2-carbon atom is substituted by a short chain aliphatic hydrocarbon group are particularly easy to prepare and, indeed, even easier to prepare than comparable long-chain compounds, and are very effective for the present use.

Shown in the most general way, as far as the 5-membered ring derivatives are concerned, the compounds contemplated for use in oxypropylation herein may be represented by the following formula:

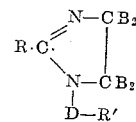

where neither of the groups R and R′ is an aliphatic or cycloaliphatic hydrocarbon group containing more than 7 carbon atoms and otherwise may be hydrogen or a hydrocarbon radical; D is a divalent organic radical, and B is selected from the class consisting of hydrogen atoms and methyl groups, with the proviso that the methyl group occurs not more than once. In the more common reagents, D will be a relatively small organic radical, such as in the following examples of the grouping D—R′:

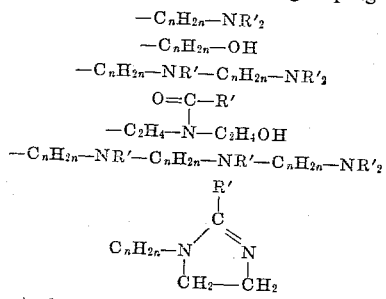

Where $n$ is the numeral 1 to 6 and R′ is hydrogen or an aliphatic or cycloaliphatic hydrocarbon radical.

In the simplest case, the group R′ may be directly attached to the 1-nitrogen atom of the ring, as follows:

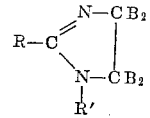

I have found that particularly desirable products result when the parent imidazoline compound contains basic nitrogen groups in addition to those inherently present in the imidazoline ring. In general, compounds of this type which are effective are those in which the basic nitrogen group is contained in the radical D in the above formula.

In this case the products may be represented by the formula:

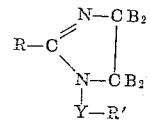

where R and R' are hydrogen or a hydrocarbon radical, and in which neither of the groups R and R' is an aliphatic or cycloaliphatic hydrocarbon group containing more than 7 carbon atoms; Y is a divalent organic radical containing amino groups, and B is selected from the class consisting of hydrogen atoms and methyl groups, with the proviso that the methyl group occurs not more than once. The group R' may be, and usually is, an amino nitrogen substituent. Examples of organic radicals which Y—R' may represent are:

$$-C_3H_4-NR_2'$$

$$C_2H_4-NR'-C_2H_4-NR_2'$$

$$-C_3H_6-NR_2'$$

$$-CH_2-CH-CH_2$$
$$\phantom{-CH_2-CH}|$$
$$\phantom{-CH_2-CH-}NR_2'$$

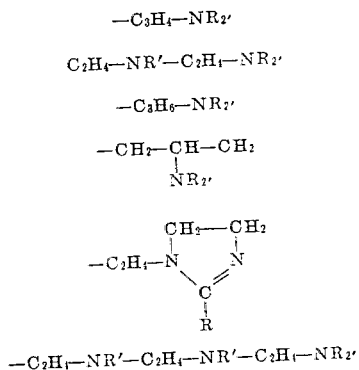

$$-C_2H_4-NR'-C_2H_4-NR'-C_2H_4-NR_2'$$

where R' and R have their previous significance.

Of this class of reagents in which an amino group occurs as a portion of the 1-nitrogen substituent, those which are derived, at least theoretically, from the polyethylene polyamines appear to be particularly effective as demulsifiers and are so outstanding as to constitute an invention within an invention. These have the general formula:

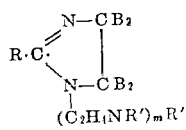

where R and R' have their previous meanings, m is a small number, usually less than 6, and B is selected from the class consisting of hydrogen atoms and methyl groups, with the proviso that the methyl group occurs not more than once.

The preparation of an imidazoline substituted in the 2-position by aliphatic hydrocarbon radicals is well described in the literature and is readily carried out by reaction between a mono-carboxylic acid and a diamine, or polyamine, containing at least one primary amino group, and at least one secondary amino group, or another primary amino group separated from the first primary amino group by two carbon atoms. Examples of suitable polyamines which can be employed for this conventional imidazoline synthesis include ethylenediamine, diethylenetriamine, triethylenetetramine, tetraethylenepentamine, 1,2-diaminopropane, N-ethyl-ethylenediamine, N,N-dibutyl-diethylenetriamine, 1,2 - diaminobutane, hydroxyethylethylenediamine, dipropylenetriamine and the like. For details of the preparation of these reagents see the following U. S. Patents: U. S. No. 1,999,989, dated April 30, 1935, Max Bockmuhl et al.; U. S. No. 2,155,877, dated April 25, 1939, Edmund Waldmann et al.; and U. S. No. 2,155,878, dated April 25, 1939, Edmund Waldmann et al. Also see Chem. Rev., 32, 47 (43).

Attention is directed to the fact that the hydrocarbon radical separating the nitrogen atoms may have as many as 4 carbon atoms, or more, provided that the chain is branched and the actual number of carbon atoms between the nitrogen atoms is not more than 3. This is illustrated by secondary butylene diamine, di-secondary butylene triamine, tri-secondary butylene tetramine, etc.

The structural formula of di-secondary butylene triamine is as follows:

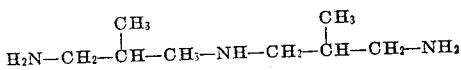

When an aliphatic or cycloaliphatic carboxylic acid containing 8 carbon atoms is employed in the above described synthesis, the resulting imidazoline or pyrimidine will contain a 2-substituent consisting of an aliphatic hydrocarbon radical containing 7 carbon atoms. Suitable demulsifiers may, therefore, be made directly by reaction of acids, such as acetic acid, hydroxyacetic acid, caprylic acid, caproic acid, furoic acid, and other similar acids with suitable amines, such as enumerated above. When this condensation is carried out at a temperature of 250° C. or higher, between equal mole proportions of mono-carboxylic acid and polyamine, two moles of water are evolved and the desired imidazoline is formed in almost quantitative yield. Such suitable reagents may be represented by the following formula:

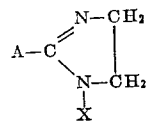

where X may be ethylene amino radicals, aminoalkyl radicals, or another imidazoline group, and where A is an aliphatic or cycloaliphatic hydrocarbon radical having no more than 7 carbon atoms. In the above formulas for imidazolines it should be pointed out that where X is a hydrogen atom, the nitrogen atoms become equivalent, insofar as reaction is concerned, and cannot be distinguished from one another. This is supposed, on theoretical grounds, to result from the mobility of the hydrogen proton, and its ease of transfer from one nitrogen atom to the other. However, where X is an organic substituent other than hydrogen, the nitrogen atoms are no longer equivalent. For the purpose of the present application, the nitrogen atom to which the radical X is attached will be called the 1-nitrogen atom of the imidazoline ring. This is in conformance with the usual chemical convention in numbering heterocyclic ring positions.

Examples of suitable substituted imidazolines and pyrimidines in which the aliphatic or cycloaliphatic group containing no more than 7 carbon atoms on either the one- or 2-position substituent, are exemplified as follows:

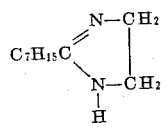

2-capryl imidazoline

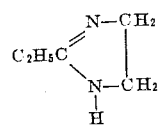

2-ethyl imidazoline

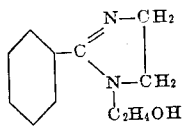

2-benzoyl, 1-hydroxyethylimidazoline

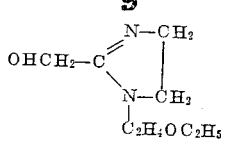

2-hydroxymethyl, 1-ethyl ethoxyimidazoline

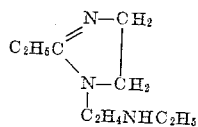

2-ethyl, 1-ethylamino ethylimidazoline

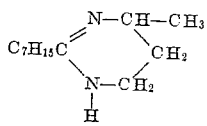

2-capryl, 4-methyl, tetrahydropyrimidine

I have pointed out above that imidazolines and pyrimidines containing basic nitrogen groups, in addition to those occurring in the imidazoline or pyrimidine ring are particularly desirable products. Such products are readily prepared from the commercially available polyethylene polyamines, or from polyamines in which there are three or more amino groups and in which there is at least one primary amino group separated by two carbon atoms from a secondary or primary amino group. Examples of suitable preferred compounds of this type are the following:

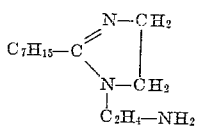

2-capryl, 1-aminoethyl imidazoline

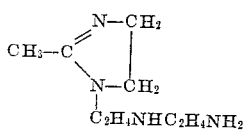

2-methyl, 1-diethylenediaminoimidazoline

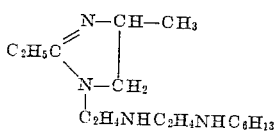

2-ethyl, 4-methyl, 1-hexyldiamino-diethyl-imidazoline

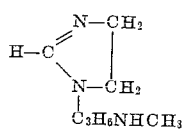

1-methylaminopropylimidazoline

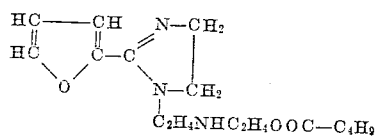

2-furyl,1-valeryloxyethylaminoethylimidazoline

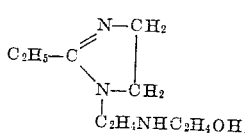

2-ethyl, 1-hydroxyethylaminoethylimidazoline

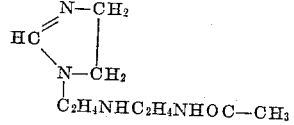

1-acetamidoethylaminoimidazoline

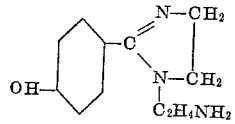

2-salicyl, aminoethylimidazoline

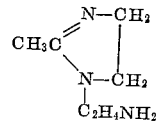

2-methyl, 1-aminoethylimidazoline

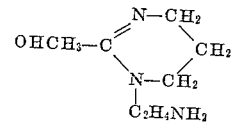

2-hydroxymethyl, 1-aminoethyltetrahydropyrimidine

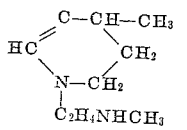

4-methyl, 1-methylaminoethyltetrahydropyrimidine

It is unnecessary to point out that when polyamines have 4 or more nitrogen atoms one can prepare a compound having 2 imidazoline rings. This may be illustrated by a compound of the following formula:

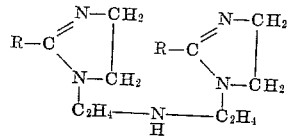

Such compounds can be derived, of course, from triethylenetetramine, tetraethylenepentamine, pentaethylenehexamine, and higher homologues. I have found no advantage in preparing such compounds containing 2 imidazoline or pyrimidine rings and, as a matter of fact, prefer to prepare the simpler compounds having only one imidazoline or pyrimidine ring. However, it is possible that in the preparation of compounds herein described intended to have only one imidazoline or pyrimidine ring there is some of the compound formed having 2 such rings. It is understood, however, that a compound having 2 such rings is the obvious chemical equivalent of the simple compound and is herein contemplated as part of the present invention.

Such diimidazolines are intended to be included when reference is made to substituted imidazolines herein or in the claims.

Attention is called also to the fact that the acid radical which becomes part of the 2-position substituent in the imidazoline or pyrimidine ring may have the element oxygen present as a member of a heterocyclic ring rather than as a hydroxyl group. An example of such an acid radical might be the radical derived from furoic acid. Such a heterocyclic acid is intended to be included in this invention since the element oxygen does not change the characteristics of the acid unduly. My preference is to use hydroxy acids if oxygen must be present rather than a heterocyclic acid containing oxygen for there is no undue benefit or definite justification in using a heterocyclic acid.

PART 2

Previous reference has been made to the formation of an ester by reaction between a polycarboxy reactant and the products obtained by oxypropylation. Actually, this is an over-simplification for reasons which are obvious on closer examination. If, for example, one employs a tetramine, pentamine, hexamine, or the like, and reacts with a low molal monocarboxy acid to form a substituted imidazoline or pyrimidine, the resultant product may have as a residue 1, 2, 3 or more amino hydrogen atoms which are susceptible to oxypropylation. It is entirely satisfactory and preferred that oxypropylation be so conducted that all amino hydrogen atoms react with propylene oxide. This may not be possible. The reason for this statement is that the oxypropylation is comparable to the oxypropylation of the parent body, i. e., the polyamine. Examination of oxypropylated polyamines, for instance, tetraethylenepentamine, suggests that there is no uniform oxypropylation at all points of reaction throughout the procedure regardless of the conditions of oxypropylation. There is every reason to believe that in the case of comparable compounds, i. e., the substituted imidazolines and pyrimidines herein employed as raw materials, the same situation prevails. This has an obvious significance insofar that one cannot predict with certainty whether or not, if there be any residual non-oxypropylated amino group present, such group in turn would be reactive towards the polycarboxy reactant to form an amide. Evidence seems to be that in some instances amides are formed but not necessarily in all instances where non-oxypropylated amino groups are present. For this reason where previous reference has been made to an ester it is true that an ester group is invariably present due to the decrease in the hydroxyl number after esterification but one cannot rule out the possibility of the formation of amides under appropriate circumstances where the reactants permit such formation.

Over and above this another factor must be considered and that is this. The substituted imidazoline ring invariably contains one broadly basic nitrogen atom. The oxypropylated nitrogen groups also may be fairly basic, at least modestly so. For this reason when a polycarboxy reactant is employed within the range previously specified and in the manner described in greater detail in Part 3 immediately succeeding there is the distinct possibility that a salt-like structure may be set up involving any free carboxyl radical. The salt-like structure may involve a multiplicity of molecules or a single molecule. No data are available in regard to this particular point although it has been subjected to careful examination. It is to be noted, however, that nothing that is said herein, in the slightest way detracts from the ability to produce the described reactants without any difficulty whatsoever and such reactants, notwithstanding certain minor variations which are possible, are all uniformly satisfactory for the herein described purpose. It is to be noted also that this does not detract in any way from the ability to point out this invention with specificity.

Amplifying what has been said previously it may be worth while to consider what happens in the case of the oxypropylation of higher polyamines because the structural elements are similar for reasons specified. As stated, there is evidence that all the available hydrogen atoms are not necessarily attacked, at least under modest oxypropylation conditions and particularly when oxypropylation proceeds at comparatively low temperature as herein described, for example, somewhere between the boiling point of water and 125° C. In the case of diethylene triamine there is some evidence that one terminal hydrogen atom only in each of the end groups is first attacked by propylene oxide and then the hydrogen atom attached to the nitrogen atom is attacked. It is quite possible that three long propylene oxide chains are built up before the two remaining hydrogens are attacked and perhaps not attacked at all. This, of course, depends on the conditions of oxypropylation. However, analytical procedure is not entirely satisfactory in some instances in differentiating between a reactive hydrogen atom attached to nitrogen and a reactive hydrogen atom attached to oxygen.

In the case of triethylenetetramine the same situation seems to follow. One hydrogen atom on the two terminal groups is first attacked and then the two hydrogen atoms on the two intermediate nitrogen atoms. Thus, four chains tend to build up and perhaps finally, if at all, the remaining two hydrogen atoms attached to the two terminal groups are attacked. In the case of tetraethylenepentamine the same approach seems to hold. One hydrogen atom on each of the terminal groups is attacked first, then the three hydrogen atoms attached to the three intermediate nitrogen atoms, and then finally, if at all, depending on conditions of oxypropylation, the two remaining terminal hydrogen atoms are attacked.

If this is the case it is purely a matter of speculation at the moment because apparently there is no data which determines the matter completely under all conditions of manufacture, and one has a situation somewhat comparable to the acylation of monoethanolamine or diethanolamine, i. e., acylation can take place involving either the hydrogen atom attached to oxygen or the hydrogen atom attached to nitrogen.

For a number of well known reasons equipment, whether laboratory size, semi-pilot plant size, pilot plant size, or large scale size, is not as a rule designed for a particular alkylene oxide. Invariably and inevitably, however, or particularly in the case of laboratory equipment and pilot plant size equipment the design is such as to use any of the customarily available alkylene oxides, i. e., ethylene oxide, propylene oxide, butylene oxide, glycide, epichlorohydrin, styrene oxide, etc. In the subsequent description of the equipment it becomes obvious that it is adapted for oxyethylation as well as oxypropylation.

Oxypropylations are conducted under a wide variety of conditions, not only in regard to presence or absence of catalyst, and the kind of catalyst, but also in regard to the time of reaction, temperature of reaction, speed of reaction, pressure during reaction, etc. For instance, oxyalkylations can be conducted at temperatures up to approximately 200° C. with pressures in about the same range up to about 200 pounds per square inch. They can be conducted also at temperatures approximating the boiling point of water or slightly above, as for example 95° to 120° C. Under such circumstances the pressure will be less than 30 pounds per square inch unless some special procedure is employed as is sometimes the case, to wit, keeping an atmosphere of inert gas such as nitrogen in the vessel during the reaction. Such low temperature-low reaction rate oxypropylations have been described very completely in U. S. Patent No. 2,448,664 to H. R. Fife, et al., dated September 7, 1948. Low temperature, low pressure oxypropylations are particularly desirable where the compound being subjected to oxypropylation contains one, two or three points of reaction only, such as monohydric alcohols, glycols and triols.

The initial reactants in the instant application may contain only one reactive hydrogen and for this reason there is possibly less advantage in using low temperature oxypropylation rather than high temperature oxypropylation. However, the reactions do not go too slowly and this particular procedure was used in the subsequent examples.

Since low pressure-low temperature-low reaction-speed oxypropylations require considerable time, for instance 1 to 7 days of 12 to 24 hours each, to complete the reaction they are conducted as a rule whether on a laboratory scale, pilot plant scale, or large scale, so as to operate automatically. The prior figure of seven days applies especially to large-scale operations. I have used conventional equipment with two added automatic features; (a) a solenoid controlled valve which shuts off the propylene oxide in event that the temperature gets outside a predetermined and set range, for instance, 95° to 120° C., and (b) another solenoid valve which shuts off the propylene oxide (or for that matter ethylene oxide if it is being used) if the pressure gets beyond a predetermined range, such as 25 to 35 pounds. Otherwise, the equipment is substantially the same as is commonly employed for this purpose where the pressure of reaction is higher, speed of reaction is faster, and time of reaction is much shorter. In such instances such automatic controls are not necessarily used.

Thus, in preparing the various examples I have found it particularly advantageous to use laboratory equipment or pilot plant equipment which is designed to permit continuous oxyalkylation whether it be oxypropylation or oxyethylation. With certain obvious changes the equipment can be used also to permit oxyalkylation involving the use of glycide where no pressure is involved except the vapor pressure of a solvent, if any, which may have been used as a diluent.

As previously pointed out the method of using propylene oxide is the same as ethylene oxide. This point is emphasized only for the reason that the apparatus is so designed and constructed as to use either oxide.

The oxypropylation procedure employed in the preparation of the oxyalkylated derivatives has been uniformly the same, particularly in light of the fact that a continuous automatically-controlled procedure was employed. In this procedure the autoclave was a conventional autoclave made of stainless steel and having a capacity of approximately 15 gallons and a working pressure of 1000 pounds gauge pressure. This pressure obviously is far beyond any requirement as far as propylene oxide goes unless there is a reaction of explosive violence involved due to accident. The autoclave was equipped with the conventional devices and openings, such as the variable-speed stirrer operating at speeds from 50 R. P. M. to 500 R. P. M.; thermometer well and thermocouple for mechanical thermometer; emptying outlet, pressure gauge, manual vent line; charge hole for initial reactants; at least one connection for introducing the alkylene oxide, such as propylene oxide or ethylene oxide, to the bottom of the autoclave; along with suitable devices for both cooling and heating the autoclave, such as a cooling jacket, and, preferably, coils in addition thereto, with the jacket so arranged that it is suitable for heating with steam or cooling with water and further equipped with electrical heating devices. Such autoclaves are, of course, in essence small-scale replicas of the usual conventional autoclave used in oxyalkylation procedure. In some instances in exploratory preparations an autoclave having a smaller capacity, for instance, approximately 3½ liters in one case and about 1¾ gallons in another case, was used.

Continuous operation, or substantially continuous operation, was achieved by the use of a separate container to hold the alkylene oxide being employed, particularly propylene oxide. In conjunction with the smaller autoclaves the container consists essentially of a laboratory bomb having a capacity of about one-half gallon, or somewhat in excess thereof. In some instances a larger bomb was used, to wit, one having a capacity of about one gallon. This bomb was equipped, also with an inlet for charging, and an eductor tube going to the bottom of the container so as to permit discharging of alkylene oxide in the liquid phase to the autoclave. A bomb having a capacity of about 60 pounds was used in connection with the 15-gallon autoclave. Other conventional equipment consists, of course, of the rupture disc, pressure gauge, sight feed glass, thermometer, connection for nitrogen for pressuring bomb, etc. The bomb was placed on a scale during use. The connections between the bomb and the autoclave were flexible stainless steel hose or tubing so that continuous weighings could be made without breaking or making any connections. This applies also to the nitrogen line, which was used to pressure the bomb reservoir. To the extent that it was required, any other usual conventional procedure or addition which provided greater safety was used, of course, such as safety glass protective screens, etc.

Attention is directed again to what has been said previously in regard to automatic controls which shut off the propylene oxide in event temperature of reaction passes out of the predetermined range or if pressure in the autoclave passes out of predetermined range.

With this particular arrangement practically all oxypropylations become uniform in that the reaction temperature was held within a few degrees of any selected point, for instance, if 105° C. was selected as the operating temperature the maximum point would be at the most 110° C. or 112° C., and the lower point would be 95° or possibly 98° C. Similarly, the pressure was held at approximately 30 pounds within a 5-pound variation one way or the other, but might drop to practically zero, especially where no solvent such as xylene is employed. The speed of reaction was comparatively slow under such conditions as compared with oxyalkylations at 200° C. Numerous reactions were conducted in which the time varied from one day (24 hours) up to three days (72 hours), for completion of the final member of a series. In some instances the reaction may take place in considerably less time, i. e., 12 hours or less, as far as a partial oxypropylation is concerned. The minimum time recorded was about a 6-hour period in a single step. Reactions indicated as being complete in 7 or 8 hours may have been complete in a lesser period of time in light of the automatic equipment employed. In the addition of propylene oxide, in the autoclave equipment as far as possible the valves were set so all the propylene oxide if fed continuously would be added at a rate so that the predetermined amount would react within the first 5 hours of the 8-hour period or two-thirds of any shorter period. This meant that if the reaction was interrupted automatically for a period of time for pressure to drop or temperature to drop the predetermined amount of oxide would still be added in most instances well within the predetermined time period. Sometimes where the addition was a comparatively small amount in a 8-hour period there would be an unquestionable speeding up of the reaction, by simply repeating the example and using 4, 5 or 6 hours instead of 8 hours.

When operating at a comparatively high temperature, for instance, between 150° to 200° C., any unreacted alkylene oxide such as propylene oxide, makes its presence felt in the increase in pressure or the consistency of a high pressure. However, at a low enough temperature it may happen that the propylene oxide goes in as a liquid. If so, and if it remains unreacted there is, of course, an inherent danger and appropriate steps must be taken to safeguard against this possibility; if need be a sample must be withdrawn and examined for unreacted propylene oxide. One obvious procedure, of course, is to oxypropylate at a modestly higher temperature, for instance, at 140° to 150° C. Unreacted oxide affects determination of the acetyl or hydroxyl value of the hydroxylated compound obtained.

The higher the molecular weight of the compound, i. e., towards the latter stages of reaction, the longer the time required to add a given amount of oxide. One possible explanation is that the molecule, being larger, the opportunity for random reaction is decreased. Inversely, the lower the molecular weight the faster the reaction takes place. For this reason, sometimes at least, increasing the concentration of the catalyst does not appreciably speed up the reaction, particularly when the product subjected to oxyalkylation has a comparatively high molecular weight. However, as has been pointed out previously, operating at a low pressure and a low temperature even in large scale operations as much as a week or ten days time may elapse to obtain some of the higher molecular weight derivatives from monohydric or dihydric materials.

In a number of operations the counterbalance scale or dial scale holding the propylene oxide bomb was so set that when the predetermined amount of propylene oxide had passed into the reaction the scale movement through a time operating device was set for either one to two hours so that reaction continued for 1 to 3 hours after the final addition of the last propylene oxide and thereafter the operation was shut down. This particular device is particularly suitable for use on larger equipment than laboratory size autoclaves, to wit, on semi-pilot plant or pilot plant size, as well as on large scale size. This final stirring period is intended to avoid the presence of unreacted oxide.

In this sort of operation, of course, the temperature range was controlled automatically by either use of cooling water, steam, or electrical heat, so as to raise or lower the temperature. The pressuring of the propylene oxide into the reaction vessel was also automatic insofar that the feed stream was set for a slow continuous run which was shut off in case the pressure passed a predetermined point as previously set out. All the points of design, construction, etc., were conventional including the gauges, check valves and entire equipment. As far as I am aware at least two firms, and possibly three, specialize in autoclave equipment such as I have employed in the laboratory, and are prepared to furnish equipment of this same kind. Similarly pilot plant equipment is available. This point is simply made as a precaution in the direction of safety. Oxyalkylations, particularly involving ethylene oxide, glycide, propylene oxide, etc., should not be conducted except in equipment especially designed for the purpose.

It is to be noted that in the present instance one has basic nitrogen atoms present. These basic nitrogen atoms will themselves catalyze the oxypropylation reaction for at least a little while. For this reason the use of an alkaline catalyst may be omitted in the beginning.

However, it is obvious that as oxypropylation proceeds the nitrogen atoms will decrease in basicity and the reaction must slow down. Then it becomes necessary to add an alkaline catalyst, such as caustic potash or caustic soda, to continue the reaction. However, there is no apparent advantage to delaying the addition of the alkaline catalyst. For this reason I prefer to add an alkaline catalyst at the very beginning and continue the reaction through without a break. In most instances 1% to 5% catalyst by weight of imidazoline will suffice.

As mentioned elsewhere the imidazolines range from water-dispersible to oil-soluble, i. e., kerosene- or xylene-soluble, as oxypropylation proceeds. As a matter of fact, I have found it preferable to employ those oxypropylation products which are oil-soluble, that is, the bulk of whose cogeneric mixtures are oil-soluble. These oil-soluble oxypropylation derivatives are represented, broadly speaking, by those imidazoline products having 25 or more moles of propylene oxide per mole of imidazoline product.

*Example 1a*

The particular autoclave used was one with a capacity of approximately 15 gallons or on the average of about 125 pounds of reaction mass. The speed of the stirrer could be varied from 150 to 350 R. P. M. The initial charge was 20 pounds of acetic acid triethylenetetramine imidazoline product taken from a batch made by reacting 33.5 parts of acetic acid with 81.5 parts of triethylenetetramine. .6 pound of caustic were added as a catalyst. The reaction pot was flushed out with nitrogen, the autoclave sealed, and the automatic devices adjusted and set for injecting 95.5 pounds of propylene oxide in a 9½-hour period. The pressure regulator was set for a maximum of 35–37 pounds per square inch. However, in this particular step and in all succeeding steps the pressure never got over about 32 pounds per square inch. In fact, this meant that the bulk of the reaction could take place and did take place at an appreciably lower pressure. This comparatively low pressure was the result of the fact that the reactant per se was basic. The propylene oxide was added at a rate of about 10 pounds per hour and at a comparatively moderate temperature, to wit, about 250°–255° F. (moderately higher than the boiling point of water). The initial introduction of propylene oxide did not start until the heating devices had raised the temperature to 245° F. At the completion of the reaction a sample was taken and oxypropylation proceeded as in Example 2a, immediately following.

*Example 2a*

70 pounds of the reaction mass identified as Example 1a, preceding, and equivalent to 12.05 pounds of imidazoline and .35 pound of catalyst and 57.5 pounds of propylene oxide were subjected to oxyalkylation with 41.1 pounds of propylene oxide.

The oxypropylation was conducted in substantially the same manner in regard to temperature and pressure as in Example 1a, preceding. Due to the smaller amount of propylene oxide introduced the time period was much shorter, to wit, 4.1 hours. The rate of oxide introduction was about 10 pounds per hour. At the end of the reaction period part of the sample was withdrawn and oxypropylation continued as in Example 3a, immediately following.

*Example 3a*

80 pounds of the reaction mass identified as Example 2a, preceding, and equivalent to 8.63 pounds of imidazoline, 71.05 pounds of propylene oxide, and .25 pound of catalyst, were permitted to stay in the autoclave. 32.55 pounds of propylene oxide were introduced in a 4-hour period. No additional catalyst was added.

The conditions of reaction as far as temperature and pressure were concerned were substantially the same as in Example 1a, preceding. The propylene oxide was added at the rate of about 8 pounds per hours. At the completion of the reaction part of the reaction mass was withdrawn and the remainder subjected to further oxypropylation as described in Example 4a, immediately following.

*Example 4a*

80 pounds of the reaction mass identified as Example 3a, preceding, and equivalent to 6.17 pounds of imidazoline, 73.6 pounds of propylene oxide, and .18 pound of catalyst were permitted to stay in the autoclave. No additional catalyst was added.

The conditions in regard to temperature and pressure were substantially the same as in Example 1a, preceding. In this instance the oxide was added in 6 hours. The amount of oxide added was 31.6 pounds. The addition was at the rate of about 5.5 pounds per hour.

What has been said herein is presented in tabular form in Table 1 immediately following with some added information as to theoretical molecular weight, hydroxyl number, etc. Also, other examples have been presented in this table as it is not necessary to cite them all in detail as has been done with the preceding examples.

| Ex. No. | Composition Before | | | Composition After | | | Theo. Mol. Wt. | OH Value | Max. Temp., °F. | Max. pres., p. s. i. g. | Time, Hrs. |
|---|---|---|---|---|---|---|---|---|---|---|---|
| | Imidazoline or Pyrimidine, lbs. | Oxide, lbs. | Catalyst, lbs. | Imidazoline or Pyrimidine, lbs. | Oxide, lbs. | Catalyst, lbs. | | | | | |
| (1) | | | | | | | | | | | |
| 1a | 20 | | .60 | 20.00 | 95.5 | .60 | 982 | 210 | 250–255 | 35–37 | 9.5 |
| 2a | 12.05 | 57.5 | .35 | 12.05 | 98.60 | .35 | 1562 | 185 | 250–255 | 35–37 | 4.1 |
| 3a | 8.68 | 71.05 | .25 | 8.68 | 103.6 | .25 | 2208 | 162 | 250–255 | 35–37 | 4.1 |
| 4a | 6.17 | 73.6 | .18 | 6.17 | 105.2 | .18 | 3070 | 135 | 250–255 | 35–37 | 5.7 |
| (2) | | | | | | | | | | | |
| 5a | 17.0 | | .45 | 17.0 | 99.4 | .45 | 951 | 220 | 250–255 | 35–37 | 8.2 |
| 6a | 10.2 | 59.6 | .27 | 10.2 | 102.2 | .27 | 1531 | 191 | 250–255 | 35–37 | 5.0 |
| 7a | 7.25 | 72.55 | .19 | 7.25 | 105.8 | .19 | 2177 | 165 | 250–255 | 35–37 | 3.7 |
| 8a | 5.43 | 79.2 | .14 | 5.43 | 113.2 | .14 | 3039 | 141 | 250–255 | 35–37 | 4.8 |
| (3) | | | | | | | | | | | |
| 9a | 26.0 | | .90 | 26.0 | 95.1 | .9 | 1034 | 200 | 250–255 | 35–37 | 10.0 |
| 10a | 16.0 | 58.5 | .56 | 16.0 | 100.3 | .56 | 1614 | 174 | 250–255 | 35–37 | 6.5 |
| 11a | 10.3 | 64.5 | .36 | 10.3 | 94.1 | .36 | 2260 | 153 | 250–255 | 35–37 | 4.0 |
| 12a | 7.85 | 72.0 | .28 | 7.85 | 102.8 | .28 | 3122 | 122 | 250–255 | 35–37 | 4.0 |
| (4) | | | | | | | | | | | |
| 13a | 18.0 | | .54 | 18.0 | 103.8 | .54 | 953 | 205 | 250–255 | 35–37 | 11.1 |
| 14a | 10.3 | 59.3 | .31 | 10.3 | 101.6 | .31 | 1523 | 181 | 250–255 | 35–37 | 6.0 |
| 15a | 6.86 | 67.8 | .21 | 6.86 | 98.8 | .21 | 2179 | 160 | 250–255 | 35–37 | 4.2 |
| 16a | 5.2 | 74.8 | .16 | 5.2 | 106.9 | .16 | 3041 | 136 | 250–255 | 35–37 | 4.7 |
| (5) | | | | | | | | | | | |
| 17a | 13.0 | | .40 | 13.0 | 107.7 | .4 | 910 | 130 | 250–255 | 35–37 | 12.8 |
| 18a | 7.5 | 62.15 | .23 | 7.5 | 106.6 | .23 | 1490 | 104 | 250–255 | 95–37 | 8.1 |
| 19a | 4.92 | 69.95 | .15 | 4.92 | 102.0 | .15 | 2136 | 88 | 250–255 | 35–37 | 7.7 |
| 20a | 3.67 | 76.0 | .11 | 3.67 | 108.6 | .11 | 2998 | 79 | 250–255 | 35.37 | 8.0 |
| (6) | | | | | | | | | | | |
| 21a | 15.0 | | .45 | 15.0 | 110.8 | .45 | 922 | 138 | 250–255 | 35–37 | 11.6 |
| 22a | 8.3 | 61.3 | .25 | 8.3 | 105.0 | .25 | 1502 | 110 | 250–255 | 35–37 | 9.6 |
| 23a | 5.48 | 69.7 | .17 | 5.48 | 101.5 | .17 | 2148 | 91 | 250–255 | 35–37 | 9.0 |
| 24a | 4.08 | 75.55 | .13 | 4.08 | 107.9 | .13 | 3010 | 80 | 250–255 | 35–37 | 9.0 |

[1] Imidazoline product derived from acetic acid and triethylenetetramine.
[2] Imidazoline product derived from glycolic acid and diethylenetriamine.
[3] Imidazoline product derived from pyromucic acid (furoic) and triethylenetetramine.
[4] Imidazoline product derived from propionic acid and diethylenetriamine.
[5] Pyrimidine product derived from acetic acid and trimethylenediamine.
[6] *Imidazoline product derived from glycolic acid and methylaminoethylamine.

NOTE.—*This imidazoline will be oxyalkylation-susceptible on the 2-position radical only.

The product at the end of the oxypropylation step, was a somewhat viscous amber to dark-reddish colored fluid. The viscosity of the oxypropylated imidazolines and pyrimidines in the present instance is generally lower than that of products derived from imidazolines and pyrimidines containing higher molal groups, such as 8 to 32 carbon atom radicals. In general the color gradually lightens as oxypropylation proceeds. The hydroxyl values mentioned in the above table immediately preceding were determined by the standard Verley-Bolsing method. This value is sometimes referred to as acetyl value and is a well known determination in the art. It is to be noted that there is no complete conversion of propylene oxide into the desired hydroxylated compounds. This is indicated by the fact that the theoretical molecular weight based on a statistical average is greater than the molecular weight when calculated on the basis of acetyl or hydroxyl value. Actually, there is no completely satisfactory method for determining the molecular weights of these types of compounds with a high degree of accuracy. In some instances the acetyl value or hydroxyl value serves as satisfactorily as an index to the molecular weight as any other procedure due to the above limitations, and especially in the higher molecular weight range. If any difficulty is encountered in the manufacture of the esters as described in Part 3, succeeding, a stoichiometrical amount of acid or acid compound should be taken which corresponds to the indicated acetyl or hydroxyl value. This matter has been discussed in the literature and is a matter of common knowledge and requires no further elaboration.

In the above table the time factors mentioned are generally longer than would ordinarily be required. Needless to say, the oxypropylation rate can be speeded by increasing the agitation or the temperature and by a choice of suitable reaction vessels. However, as it is sometimes desirable to allow the reaction mass to stir for as long as a half-hour to one hour before drawing a sample after the addition of propylene oxide has stopped, these time factors are not considered excessive. I have chosen them at my own preference and they can be varied moderately one way or the other, depending on one's inclination.

PART 3

As pointed out previously the present invention is concerned which compounds or derivatives involving ester linkages obtained from the oxypropylated derivatives described in Part 2 immediately preceding, and polycarboxy acids, particularly tricarboxy acids like citric acid and dicarboxy acids such as adipic acid, phthalic acid, or anhydride, succinic acid, diglycolic acid, sebacic acid, azelaic acid, aconitic acid, maleic acid or anhydride, citraconic acid or anhydride, maleic acid or anhydride adducts as obtained by the Diels-Alder reaction from products such as maleic anhydride and cyclopentadiene. Such acids should be heat stable so they are not decomposed during esterification. They may contain as many as 36 carbon atoms as, for example, the acids obtained by dimerization of unsaturated fatty acids, unsaturated monocarboxy fatty acids, or unsaturated monocarboxy acids having 18 carbon atoms. Reference to the acid in the hereto appended claims obviously includes the anhydrides or any other obvious equivalents. My preference, however, is to use polycarboxy acids having not over 8 carbon atoms.

The production of esters including acid esters (fractional esters) from polycarboxy acids and polyols or other hydroxylated compounds is well known. In this case the hydroxylated compounds obtained as described in Part 2, preceding, contain nitrogen atoms which are apt to be basic. Thus, as has been explained previously, it is probable, particularly where there is a basic nitrogen atom present, that salts may be formed but in any event under the conditions described it is improbable, in fact almost impossible, for the reaction to take place without the formation of ester linkages. It has been pointed out, also, that under some of the circumstances at least, amidification may enter into the reaction. Over and above this is that the fact that the radical previously indicated as R, i. e., the radical attached to the 2-position carbon atom of the ring, may include in its structure a hydroxyl group. Thus, it becomes obvious that even if a dicarboxy acid or anhydride is employed there may be present 3 or more points of reaction in the other material employed in the esterification reaction, i. e., the oxypropylated derivative. For this reason there is also the possibility, unless appropriate precautions are taken, that insoluble resins or gelatinous materials will be formed. I have found that this can be avoided by adding sufficient low molal sulfonic acid, such as paratoluene sulfonic acid, or even hydrochloric acid, to neutralize the basicity prior to esterification. The addition of such acid catalyst, of course, serves another purpose—to eliminate any basic catalyst which was left from the oxypropylation procedure. Needless to say, addition of the strong acid provides the conventional role of esterification catalyst which is desirable in the instant case although not absolutely essential in such case. The same situation has been noted in comparable reactions, for instance, esterification of triethanolamine or polymerized derivatives of triethanolamine. It means, perhaps, that in the instant case the compounds employed in the process for breaking petroleum emulsions contain in part the salt form of hydrochloric acid or paratoluene sulfonic acid, or whatever acid may be employed in this particular procedure. In any event, this is merely a matter of detail and such procedures are well known in comparable processes and do not affect the step herein referred to as the esterification procedure, although, as pointed out, in at least a number of instances it is more complicated than simple esterification.

Needless to say, various compounds of the polycarboxy acids may be used instead of the free acid, such as the low molal ester, the anhydride, the acyl chloride, etc. However, for purpose of economy it is customary to use either the acid or the anhydride. A conventional procedure is employed. On a laboratory scale one can employ a resin pot of the kind described in U. S. Patent No. 2,499,370, dated March 7, 1950, to De Groote and Keiser, and particularly with one more opening to permit the use of a porous spreader if hydrochloric acid gas is to be used as a catalyst. Such device or absorbtion spreader consists of minute alundum thimbles which are connected to a glass tube. One can add a sulfonic acid such as paratoluene sulfonic acid as a catalyst. There is some objection to this because in some instances there is some evidence that this acid catalyst tends to decompose or rearrange heat-oxypropylated compounds, and particularly likely to do so if the esterification temperature is too high. Generally, care is taken to add just a very slight excess of acid for the actual esterification. The use of hydrochloric acid gas has one advantage over paratoluene sulfonic acid and that is that at the end of the reaction it can be mostly removed by flushing out with nitrogen, whereas there is no reasonably convenient means available of removing the paratoluene sulfonic acid or other sulfonic acid employed. If hydrochloric acid is employed one need only pass the gas through at an exceedingly slow rate so as to keep the reaction mass acidic. Only a trace of acid need be present. I have employed hydrochloric acid gas or the aqueous acid itself.

The products obtained in Part 2 preceding almost always contain a basic catalyst. As a general procedure I have added an amount of half-concentrated hydrochloric acid considerably in excess of what is required to neutralize the residual catalyst. The mixture is shaken thoroughly with xylene and allowed to stand overnight. It is then filtered and refluxed with the xylene present until the water can be separated in a phase-separating trap. As soon as the product is substantially free from water the distillation stops. This preliminary step can be carried out in the flask to be used for esterification. If there is any further deposition of sodium chloride during the reflux stage needless to say a second filtration may be required. In any event the neutral or slightly acidic solution of the oxypropylated derivatives described in Part 2 is then diluted further with sufficient xylene, decalin, petroleum solvent, or the like, so that one has obtained approximately a 40% solution. To this solution there is added a polycarboxylated reactant as previously described, such as phthalic anhydride, succinic acid or anhydride, diglycollic acid, etc. The mixture is refluxed until esterification is complete as indicated by elimination of water or drop in carboxyl value. Needless to say, if one produces a half-ester from an anhydride such as phthalic anhydride, no water is eliminated. However, if it is obtained from diglycollic acid, for example, water is eliminated. Ordinarily this refluxing temperature is apt to be in the neighborhood of 160° C. to possibly 190° C. All such procedures are conventional and have been so thoroughly described in the literature that further consideration will be limited to a few examples and a comprehensive table.

The above mentioned petroleum solvents are sold by various oil refineries and, as far as solvent effect, act as if they were almost completely aromatic in character. Typical distillation data in the particular type I have employed and found very satisfactory is the following:

| | |
|---|---|
| I. B. P., 142° C. | 50 ml., 242° C. |
| 5 ml., 200° C. | 55 ml., 244° C. |
| 10 ml., 209° C. | 60 ml., 248° C. |
| 15 ml., 215° C. | 65 ml., 252° C. |
| 20 ml., 216° C. | 70 ml., 252° C. |
| 25 ml., 220° C. | 75 ml., 260° C. |
| 30 ml., 225° C. | 80 ml., 264° C. |
| 35 ml., 230° C. | 85 ml., 270° C. |
| 40 ml., 234° C. | 90 ml., 280° C. |
| 45 ml., 237° C. | 95 ml., 307° C. |

The addition of such high-boiling solvent or solvents in conjunction with xylene provides a very flexible system for controlling the esterification temperature. Obviously, the more xylene present the lower will be the refluxing temperature and, conversely, the more high boiling solvent present the higher will be the refluxing temperature. Normally, I prefer to start refluxing at as low a temperature as possible, i. e., with much xylene present, but if the esterification reaction does not seem to be proceeding satisfactorily then I merely withdraw more and more solvent mixture from the reflux trap thereby raising the temperature. As mentioned, by using this method the esterification temperature can be ranged easily from 160° to possibly 190° C. My preference is not to go over 200° C. under any circumstances.

The use of such solvent is extremely satisfactory provided one does not attempt to remove the solvent subsequently except by vacuum distillation and provided there is no objection to a little residue. Actually, when these materials are used for a purpose such as demulsification the solvent might just as well be allowed to remain. If the solvent is to be removed by distillation, and particularly vacuum distillation, then the high boiling aromatic petroleum solvent might well be replaced by some more expensive solvent, such as decalin or an alkylated decalin which has a rather definite or close range boiling point. The removal of the solvent, of course, is purely a conventional procedure and requires no elaboration.

When esterification is complete, it is usually necessary to adjust the final solvent-compound solution so as to produce a clear bright product.

Attention is called to the fact that the relative solubilities of the products of the present invention change from stage to stage in their manufacture. The low molal imidazoline or pyrimidine is almost completely water-soluble. The oxypropylated imidazoline or pyrimidine is almost always much more oil-soluble, i. e., xylene-soluble, than water-soluble. This is especially true with the higher ratios of propylene oxide, i. e., 40 to 60 moles of oxide per mole of imidazoline. However, upon esterification with a polycarboxy acid which leaves free carboxy groups forming the acidic fractional ester the compound once again lies on the water-soluble side. Such is not the case when the original imidazoline or pyrimidine was made from a high molal acid, such as one containing 8 to 32 carbon atoms. Such a final product may be somewhat water-dispersible but is clearly more oil-soluble, i. e., xylene-soluble. Reference is made to the co-pending application, Serial No. 281,645. Accordingly, the compound of the present instance, to wit, the acidic fractional esters, must be mixed with a highly polar solvent in order to produce a homogeneous system. I have found the use of an alcohol such as methanol or propanol quite satisfactory. If more alcohol is present than xylene no trouble is encountered in producing a homogeneous system. Usually xylene will be present since it was used as a refluxing agent during esterification. If this xylene content, however, is kept at a minimum then no trouble will be encountered in being able to add enough alcohol to produce a homogeneous system.

It may be well to mention here that if one chose to remove the xylene or other aromatic solvent, such as by vacuum distillation, water itself could be used as a polar solvent in some cases. Also, the products could be dissolved in pure alcohol. However, I have found it of no particular advantage to completely remove the oil solvent since a solvent such as isopropyl alcohol, for instance, will not only dissolve the products of this invention but also dissolve any oil solvent present, such as xylene.

Other procedures for eliminating the basic residual catalyst, if any, can be employed. For example, the oxyalkylation can be conducted in the absence of a solvent or the solvent removed after oxypropylation. Such oxypropylation end product can then be acidified with just enough concentrated hydrochloric acid to just neutralize the residual basic catalyst. To this product one can then add a small amount of anhydrous sodium sulfate (sufficient in quantity to take up any water that is present) and then subject the mass to centrifugal force so as to eliminate the hydrated sodium sulfate and probably the sodium chloride formed. The clear, somewhat viscous amber-to-dark-amber liquid so obtained may contain a small amount of sodium sulfate or sodium chloride but, in any event, is perfectly acceptable for esterification in the manner previously described.

TABLE 3

| Ex. No. of Acid Ester | Solvent | Amt. Solvent (grams) | Max. Esterification Temp., °C. | Time of Esterification (hrs.) | Water Out (cc.) |
|---|---|---|---|---|---|
| 1b | Xylene-isopropanol | 215.1 | 160 | 6 | 10.1 |
| 2b | do | 234.0 | 160 | 6 | |
| 3b | do | 188.5 | 160 | 6 | 30.0 |
| 4b | do | 240.8 | 160 | 6 | 10.2 |
| 5b | do | 207.3 | 160 | 6 | 8.9 |
| 6b | do | 224.0 | 160 | 6 | |
| 7b | do | 184.2 | 160 | 6 | 26.2 |
| 8b | do | 269.9 | 160 | 6 | 9.1 |
| 9b | do | 200.2 | 160 | 6 | 7.8 |
| 10b | do | 214.8 | 160 | 6 | |
| 11b | do | 179.4 | 160 | 6 | 23.5 |
| 12b | do | 220.3 | 160 | 6 | 7.7 |
| 13b | do | 191.8 | 160 | 6 | 6.5 |
| 14b | do | 204.0 | 160 | 6 | |
| 15b | do | 174.7 | 160 | 6 | 19.3 |
| 16b | do | 208.4 | 160 | 6 | 6.6 |

The procedure for manufacturing the esters has been illustrated by preceding examples. If for any reason reaction does not take place in a manner that is acceptable, attention should be directed to the following details: (a) Recheck the hydroxyl or acetyl value of the oxypropylated derivative and use a stoichiometrically equivalent amount of acid; (b) if the reaction does not proceed with reasonable speed either raise the temperature indicated or else extend the period of time up to 12 or 16 hours if need be; (c) if necessary, increase the amount of acid catalyst; (d) if the esterification does not produce a clear product a check should be made to see if an inorganic salt such as sodium chloride or sodium sulfate is not precipitating out. Such salt should be eliminated, at least for exploration experimentation, and can be removed by filtering. Everything else being equal, as the size of the molecule increases and the reactive hydroxyl radical represents a smaller fraction of the entire molecule, more difficulty is involved in obtaining complete esterification.

These acidic esters vary in color from amber to virtually a black solution, generally following close to the color of their parent oxypropylated derivative. Like the oxypropylated derivatives they are somewhat viscous and even tend to be somewhat more viscous than the parent compound. In all cases it is necessary to use a semipolar or polar solvent, such as methanol, to take the esters into solution.

Even under the most carefully controlled conditions of oxypropylation involving comparatively low temperature and long time of reaction there are formed certain compounds whose compositions are still obscure. Such side reaction products can contribute a substantial proportion of the final cogeneric reaction mixture. Various suggestions have been made as to the nature of these compounds, such as being cyclic polymers of propylene oxide,

TABLE 2

| Ex. No. of Acidic Ester | Ex. No. of Hydroxy Compound | Theo. Mol. Wt. | Hydroxyl Value | Amt. of Hydroxy Compound (grams) | Polycarboxy Reactant | Amt. of Polycarboxy Reactant (grams) |
|---|---|---|---|---|---|---|
| 1b | 1a | 982 | 210 | 150 | Diglycolic Acid | 75.2 |
| 2b | 1a | 982 | 210 | 150 | Phthalic Anhydride | 84.0 |
| 3b | 1a | 982 | 210 | 150 | Oxalic Acid | 68.5 |
| 4b | 1a | 982 | 210 | 150 | Aconitic Acid | 101.0 |
| 5b | 2a | 1,562 | 185 | 150 | Diglycolic Acid | 66.2 |
| 6b | 2a | 1,562 | 185 | 150 | Phthalic Anhydride | 74.0 |
| 7b | 2a | 1,562 | 185 | 150 | Oxalic Acid | 60.4 |
| 8b | 2a | 1,562 | 185 | 150 | Aconitic Acid | 89.0 |
| 9b | 3a | 2,208 | 162 | 150 | Diglycolic Acid | 58.0 |
| 10b | 3a | 2,208 | 162 | 150 | Phthalic Anhydride | 64.8 |
| 11b | 3a | 2,208 | 162 | 150 | Oxalic Acid | 52.9 |
| 12b | 3a | 2,208 | 162 | 150 | Aconitic Acid | 78.0 |
| 13b | 4a | 3,070 | 135 | 150 | Diglycolic Acid | 48.3 |
| 14b | 4a | 3,070 | 135 | 150 | Phthalic Anhydride | 54.0 |
| 15b | 4a | 3,070 | 135 | 150 | Oxalic Acid | 44.0 |
| 16b | 4a | 3,070 | 135 | 150 | Aconitic Acid | 65.0 | dehydration products with the appearance of a vinyl radical, or isomers of propylene oxide or derivatives thereof, i. e., of an aldehyde, ketone, or allyl alcohol. In some instances an attempt to react the stoichiometric amount of a polycarboxy acid with the oxypropylated derivative results in an excess of the carboxylated reactant for the reason that apparently under conditions of reaction less reactive hydroxyl radicals are present than indicated by the hydroxyl value. Under such circumstances there is simply a residue of the carboxylic reactant which can be removed by filtration or, if desired, the esterification procedure can be repeated using an appropriately reduced ratio of carboxylic reactant.

Even the determination of the hydroxyl value and conventional procedure leaves much to be desired due either to the cogeneric materials previously referred to, or for that matter, the presence of any inorganic salts or propylene oxide. Obviously this oxide should be eliminated.

The solvent employed, if any, can be removed from the finished ester by distillation and particularly vacuum distillation. The final products or liquids are generally pale amber to dark amber in color, and show moderate viscosity. They can be bleached with bleaching clays, filtering chars, and the like. However, for the purpose of demulsification or the like color is not a factor and decolorization is not justified.

PART 4

In the hereto appended claims the product is described as an ester obtained from a hydroxylated material prepared from an imidazoline or pyrimidine material. If one were concerned with a monohydroxylated material or a dihydroxylated material one might be able to write a formula which in essence would represent the particular product. However, in a more highly hydroxylated material the problem becomes increasingly more difficult for reasons which have already been indicated in connection with oxypropylation and which can be examined by merely considering for the moment a monohydroxylated material.

Oxyalkylation particularly in any procedure which involves the introduction of repetitious ether linkages, i. e., excessive oxyalkylation, using, for example, ethylene oxide, propylene oxide, etc., runs into difficulties of at least two kinds; (a) formation of a cogeneric mixture rather than a single compound, and (b) excessive side reactions or the like. The former phase will be considered in the paragraphs following. As to the latter phase, see U. S. Patent No. 2,236,919 dated April 1, 1941, to Reynhart.

Oxypropylation involves the same sort of variations as appear in preparing high molal polypropyleneglycols. Propylene glycol has a secondary alcoholic radical and a primary alcohol radical. Obviously then polypropylene glycols could be obtained, at least theoretically, in which two secondary alcoholic groups are united or a secondary alcohol group is united to a primary alcohol group, etherization being involved, of course, in each instance. Needless to say, the same situation applies when one has oxypropylated polyhydric materials having 4 or more hydroxyls, or the obvious equivalent.

Usually no effort is made to differentiate between oxypropylation taking place, for example, at the primary alcohol radical or the secondary alcohol radical. Actually, when such products are obtained, such as a high molal polypropylene glycol or the products obtained in the manner herein described one does not obtain a single derivative such as $HO(RO)_nH$ or $—(RO)_nH$ in which $n$ has one and only one value, for instance, 14, 15 or 16, or the like. Rather, one obtains a cogeneric mixture of closely related or touching homologues. These materials invariably have high molecular weights and cannot be separated from one another by any known procedure without decomposition. The proportion of such mixture represents the contribution of the various individual members of the mixture. On a statistical basis, of course, $n$ can be appropriately specified. For practical purposes one need only consider the oxypropylation of a monohydric alcohol because in essence this is substantially the mechanism involved. Even in such instances where one is concerned with a monohydric reactant one cannot draw a single formula and say that by following such procedure one can readily obtain 80% or 90% or 100% of such compound. However, in the case of at least monohydric initial reactants one can readily draw the formulas of a large number of compounds which appear in some of the probable mixtures or can be prepared as components and mixtures which are manufactured conventionally.

Simply by way of illustration reference is made to U. S. Patent No. 2,549,434, dated April 17, 1951, to De Groote, Wirtel and Pettingill.

However, momentarily referring again to a monohydric initial reactant it is obvious that if one selects any such simple hydroxylated compound and subjects such compound to oxyalkylation, such as oxyethylation, or oxypropylation, it becomes apparent that one is really producing a polymer of the alkylene oxides except for the terminal group. This is particularly true where the amount of oxide added is comparatively large, for instance, 10, 20, 30, 40, or 50 units. If such compound is subjected to oxyethylation so as to introduce 30 units of ethylene oxide, it is well known that one does not obtain a single constituent which, for the sake of convenience, may be indicated as $RO(C_2H_4O)_{30}OH$. Instead, one obtains a cogeneric mixture of closely related homologues, in which the formula may be shown as the following: $RO(C_2H_4O)_nH$, wherein $n$, as far as the statistical average goes, is 30, but the individual members present in significant amount may vary from instances where $n$ has a value of 25, and perhaps less, to a point where $n$ may represent 35 or more. Such mixture is, as stated, a cogeneric closely related series of touching homologous compounds. Considerable investigation has been made in regard to the distribution curves for linear polymers. Attention is directed to the article entitled "Fundamental principles of condensation polymerization," by Flory, which appeared in Chemical Reviews, volume 39, No. 1, page 137.

Unfortunately, as has been pointed out by Flory and other investigators, there is no satisfactory method, based on either experimental or mathematical examination, of indicating the exact proportion of the various members of touching homologous series which appear in cogeneric condensation products of the kind described. This means that from the practical standpoint, i. e., the ability to describe how to make the product under consideration and how to repeat such production time after time without difficulty, it is necessary to resort to some other method of description, or else consider the value of $n$, in formulas such as those which have appeared previously and which appear in the claims, as representing both individual constituents in which $n$ has a single definite value, and also with the understanding that $n$ represents the average statistical value based on the assumption of completeness of reaction.

This may be illustrated as follows: Assume that in any particular example the molal ratio of propylene oxide per hydroxyl is 15 to 1. In a generic formula 15 to 1 could be 10, 20, or some other amount and indicated by $n$. Referring to this specific case actually one obtains products in which $n$ probably varies from 10 to 20, perhaps even further. The average value, however, is 15, assuming, as previously stated, that the reaction is complete. The product described by the formula is best described also in terms of method of manufacture.

The significant fact in regard to the oxypropylated imidazoline or pyrimidine products herein described is that in their initial state of oxypropylation they are substantially all water-soluble or water-dispersible. As oxypropylation proceeds the oil solubility increases and the water-solubility decreases. When one reaches, for instance, the molecular weight of 2000 to 3000 in the present case, for all practical purposes the compounds are oil-soluble, i. e., kerosene and, of course, xylene-soluble. However, in between if a sample of the product is shaken with water and allowed to stand varying percentages will not dissolve in water. As the ratio of propylene oxide to imidazoline product increases the ratio of oil-solubility to water-solubility increases. I consider such varying solubility factors to be all the more indicative of the fact that oxypropylation here produces cogeneric mixtures, some of which are completely oil-soluble and some of which are still water-soluble. The exact composition is open to question for reasons which are common to all oxyalkylations. It is interesting to note, however, that the molecular weights based on hydroxyl determination are almost always considerably less than the molecular weight based on theoretical consideration.

It becomes obvious when carboxylic acidic esters are prepared from such high molecular weight materials that the ultimate esterification product again must be a cogeneric mixture. Likewise, it is obvious that the contribution to the toal molecular weight made by the polycarboxy acid is small. By the same token, one would expect the effectiveness of the final product to be comparable to the unesterified hydroxylated material. Remarkably enough, in practically every instance the product is distinctly better, and in the majority much more effective.

PART 5

As pointed out previously the final product obtained is a fractional ester having free carboxyl radicals. Such product can be used as an intermediate for conversion into other derivatives which are effective for various purposes, such as the breaking of petroleum emulsions of the kind herein described. For instance, such product can be neutralized with an amine so as to increase its water-solubility such as triethanolamine, tripropanolamine, oxyethylated triethanolamine, etc. Similarly, such product can be neutralized with some amine which tends to reduce the water-solubility such as cyclohexylamine, benzylamine, decylamine, tetradecylamine, octadecylamine, etc. Furthermore, the residual carboxyl radicals can be esterified with alcohols, such as low molal alcohols, methyl, ethyl, propyl, butyl, etc. and also high molal alcohols, such as octyl, decyl, cyclohexanol, benzyl alcohol, octadecyl alcohol, etc. Such products are also valuable for a variety of purposes due to their modified solubility. This is particularly true where surface-active materials are of value and especially in demulsification of water-in-oil emulsions.

Having thus described my invention, what I claim as new and desire to secure by Letters Patent, is:

1. Hydrophile synthetic products; said hydrophile synthetic products being the esters of (A) a polycarboxy acid selected from the group consisting of acyclic and isocyclic polycarboxy acids composed of carbon, hydrogen and oxygen and having not more than 8 carbon atoms and (B) an oxypropylated ring compound of the formula

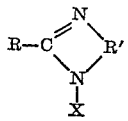

derived from a polyalkylene amine containing from 2 to 8 nitrogen atoms and an acid of the formula R—COOH in which R is selected from the group consisting of 1 to 7 carbon-atom alkyl radicals and their hydroxy derivatives, and 1 to 7 carbon-atom cycloalkyl radicals and their hydroxy derivatives, benzoyl, salicyl, anisyl and furyl; R' is a divalent alkylene radical selected from the group consisting of $$-CH_2CH_2-$$
$$-CH_2CH_2CH_2-$$
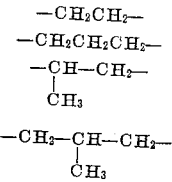

and X is the portion of the said polyalkylene amine which does not form a part of the ring of said ring compound, said ring compound being free from any group having more than 7 uninterrupted carbon atoms and being oxypropylated by reaction with propylene oxide to the point where it contains from 12 to about 60 oxypropylene groups per heterocyclic ring; said ester containing at least one polycarboxy acid radical for each reactive hydroxyl radical.

2. A composition according to claim 1 in which the polycarboxy acid (A) is diglycolic acid and the oxypropylated ring compound (B) is derived from triethylenetetramine and acetic acid.

3. A composition according to claim 1 in which the polycarboxy acid (A) is diglycolic acid and the oxypropylated ring compound (B) is derived from diethylenetriamine and glycolic acid.

4. A composition according to claim 1 in which the polycarboxy acid (A) is diglycolic acid and the oxypropylated ring compound (B) is derived from triethylenetetramine and furoic acid.

5. A composition according to claim 1 in which the polycarboxy acid (A) is diglycolic acid and the oxypropylated ring compound (B) is derived from diethylenetriamine and propionic acid.

6. A composition according to claim 1 in which the polycarboxy acid (A) is diglycolic acid and the oxypropylated ring compound (B) is derived from methylaminoethylamine and glycolic acid.

References Cited in the file of this patent
UNITED STATES PATENTS

| Re. 23,227 | Blair et al. | May 9, 1950 |
| 2,262,357 | De Groote et al. | Nov. 11, 1941 |
| 2,324,491 | De Groote et al. | July 20, 1943 |
| 2,369,818 | De Groote et al. | Feb. 20, 1945 |
| 2,468,180 | De Groote et al. | Apr. 26, 1949 |